United States Patent
Chen et al.

(10) Patent No.: US 10,507,382 B2
(45) Date of Patent: Dec. 17, 2019

(54) METHOD FOR CONTROLLING SET-TOP BOX GAME, REMOTE CONTROL SYSTEM, AND HANDHELD ELECTRONIC APPARATUS

(71) Applicant: Shanghai Zhaoxin Semiconductor Co., Ltd., Shanghai (CN)

(72) Inventors: Linfeng Chen, Shanghai (CN); Jian Wang, Shanghai (CN); Tao He, Shanghai (CN); Yaowei Shang, Shanghai (CN); Xin Li, Shanghai (CN)

(73) Assignee: Shanghai Zhaoxin Semiconductor Co., Ltd., Shanghai (CN)

(\*) Notice: Subject to any disclaimer, the term of this patent is extended or adjusted under 35 U.S.C. 154(b) by 0 days.

(21) Appl. No.: 15/943,732

(22) Filed: Apr. 3, 2018

(65) Prior Publication Data
US 2019/0184281 A1    Jun. 20, 2019

(30) Foreign Application Priority Data
Dec. 15, 2017   (CN) .......................... 2017 1 1350313

(51) Int. Cl.
| | |
|---|---|
| *A63F 13/2145* | (2014.01) |
| *A63F 13/235* | (2014.01) |
| *G06F 3/0488* | (2013.01) |
| *A63F 13/26* | (2014.01) |
| *A63F 13/24* | (2014.01) |

(52) U.S. Cl.
CPC ........ *A63F 13/2145* (2014.09); *A63F 13/235* (2014.09); *A63F 13/24* (2014.09); *A63F 13/26* (2014.09); *G06F 3/04886* (2013.01)

(58) Field of Classification Search
CPC .......................... A63F 13/2145; G06F 3/1454
See application file for complete search history.

(56) References Cited

U.S. PATENT DOCUMENTS

| | | | |
|---|---|---|---|
| 6,921,336 B1* | 7/2005 | Best ........................ | A63F 13/10 463/32 |
| 2016/0147498 A1* | 5/2016 | Son ....................... | G06F 3/1454 345/2.2 |

\* cited by examiner

*Primary Examiner* — Reginald A Renwick
(74) *Attorney, Agent, or Firm* — JCIPRNET (57) ABSTRACT

A method for controlling STB game, a remote control system and a handheld electronic apparatus are provided. After the handheld electronic apparatus is connected to the STB, when a gamepad mode is enabled, a virtual gamepad interface is displayed through a touch display panel of the handheld electronic apparatus, so as to simulate an operation method of a real gamepad. When the screen capturing mode is enabled, a game image of the display is captured and displayed on the touch display panel of the handheld electronic apparatus, and a specific function set in the game image is controlled through the touch display panel.

10 Claims, 9 Drawing Sheets

METHOD FOR CONTROLLING SET-TOP BOX GAME, REMOTE CONTROL SYSTEM, AND HANDHELD ELECTRONIC APPARATUS

CROSS-REFERENCE TO RELATED APPLICATION

This application claims the priority benefit of China application serial No. 201711350313.X, filed on Dec. 15, 2017. The entirety of the above-mentioned patent application is hereby incorporated by reference herein and made a part of this specification.

BACKGROUND OF THE INVENTION

Field of the Invention

The invention relates to a remote control mechanism, and particularly relates to a method for controlling set-top box game, a remote control system and a handheld electronic apparatus.

Description of Related Art

A set-top box (STB) is a used for device connecting a television and an external signal source. For example, the STB is an Internet protocol television (IPTV) box or an over-the-top (OTT) box. The STB may convert source signals into television content, and display the same on the television.

An electronic game running on a mobile device is generally controlled through a touch controller. When the electronic game is installed to the STB using the television as a display device, since the STB does not have a touch controller, another effective method is required to control the electronic game.

SUMMARY OF THE INVENTION

The invention is directed to a method for controlling set-top box (STB) game, a remote control system and a handheld electronic apparatus, and the handheld electronic apparatus is used for controlling a STB game.

The invention provides a method for controlling STB game including connecting a handheld electronic apparatus with a STB, wherein the handheld electronic apparatus includes a touch display panel and provides a gamepad mode and a screen capturing mode, and the STB is installed with an electronic game and is configured to present a game image on a display; after the handheld electronic apparatus is connected to the STB, when the gamepad mode is enabled, displaying a virtual gamepad interface through the touch display panel, wherein the virtual gamepad interface includes a plurality of virtual function keys, and an operation method of a real gamepad is simulated through the virtual function keys; and after the handheld electronic apparatus is connected to the STB, when the screen capturing mode is enabled, capturing the game image of the display and displaying the game image on the touch display panel, and controlling a specific function set in the game image through the touch display panel.

In an embodiment of the invention, after the step of displaying the virtual gamepad interface through the touch display panel, the method further includes: when the STB receives a keystroke event of the virtual gamepad interface from the handheld electronic apparatus, converting the keystroke event into a touch event corresponding to the display by the STB, and executing the touch event by the STB.

In an embodiment of the invention, after the step of capturing the game image of the display and displaying the game image on the touch display panel, the method further includes: when it is detected that the touch display panel receives a touch operation, transmitting a touch position of the touch display panel to the STB by the handheld electronic apparatus; converting the touch position into a corresponding position complied with a coordinate system of the display by the STB; and when it is determined that the corresponding position is within a region set with the specific function, executing the specific function by the STB.

In an embodiment of the invention, under the gamepad mode, the touch display panel is applied to remote-control an attack operation or a move operation of the electronic game.

In an embodiment of the invention, the specific function includes buying a game item or changing game equipment.

The invention provides a remote control system including a display; a STB, which is coupled to the display and installed with an electronic game, and presents a game image of the electronic game to the display when executing the electronic game; and a handheld electronic apparatus including a touch display panel, and providing a gamepad mode and a screen capturing mode. After the handheld electronic apparatus is connected to the STB, when the gamepad mode is enabled, a virtual gamepad interface is displayed through the touch display panel, wherein the virtual gamepad interface includes a plurality of virtual function keys, and an operation method of a real gamepad is simulated through the virtual function keys. After the handheld electronic apparatus is connected to the STB, when the screen capturing mode is enabled, the game image of the display is captured and displayed on the touch display panel, and a specific function set in the game image is controlled through the touch display panel.

The invention provides a handheld electronic apparatus including a communication device, which is connected to a STB through a network; a touch display panel; a storage device, which stores a remote control application composed of one or a plurality of program snippets; and a processor, which is coupled to the communication device, the touch display panel and the storage device, and executes the remote control application to control an electronic game on the STB. After the processor executes the remote control application, the processor is connected to the STB through the communication device, and displays an operation interface, wherein the operation interface provides a gamepad mode and a screen capturing mode. When the gamepad mode is enabled, the processor displays a virtual gamepad interface through the touch display panel, wherein the virtual gamepad interface includes a plurality of virtual function keys, and an operation method of a real gamepad is simulated through the virtual function keys. When the screen capturing mode is enabled, the processor captures the game image presented in the display by the STB and displays the game image on the touch display panel, and controls a specific function set in the game image through the touch display panel.

According to the above description, the touch display panel of the handheld electronic apparatus is applied to control the STB game, and two operation modes are provided, where one is the gamepad mode, which is used for simulating a real gamepad; and another is the screen capturing mode, which is used for displaying a frame the same as that of the display to execute the specific function. In this way, the old gamepad operation mode is used in collaboration with the touch operation mode to provide a more intuitive operation feeling.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
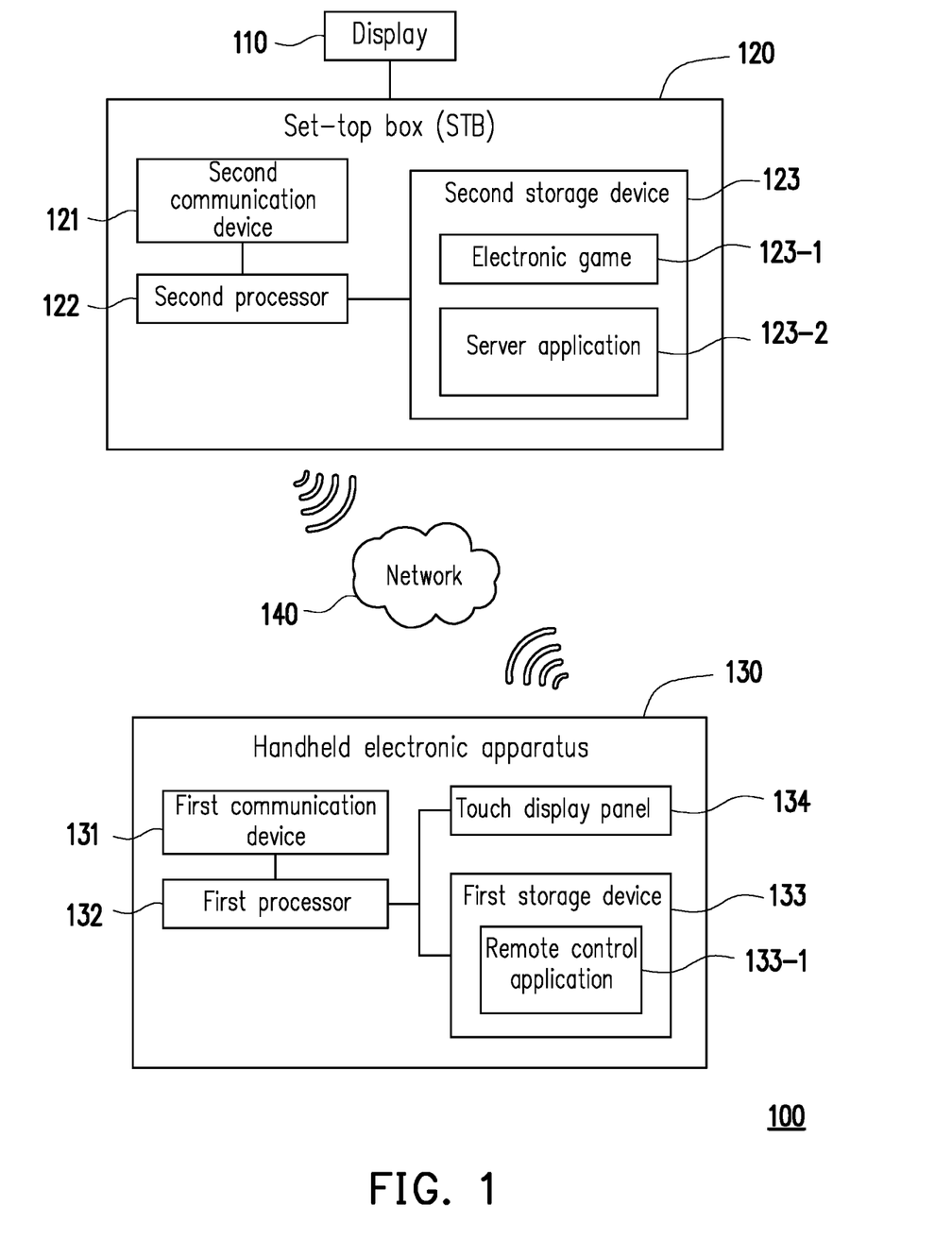
FIG. 1 is a block diagram of a remote control system according to an embodiment of the invention.

FIG. 1 is a block diagram of a remote control system according to an embodiment of the invention. Referring to FIG. 1, the remote control system 100 includes a display 110; a set-top box (STB) 120 and a handheld electronic apparatus 130. The STB 120 is coupled to the display 110, and is connected to the handheld electronic apparatus 130 through a network 140.

The handheld electronic apparatus 130 is, for example, a smart phone. The handheld electronic apparatus 130 includes a first communication device 131, a first processor 132, a first storage device 133 and a touch display panel 134. The first storage device 133 stores a remote control application 133-1 composed of one or a plurality of program snippets. The first processor 132 may execute the remote control application 133-1 to communicate with a server application 123-2 of the STB 120, so as to control an electronic game 123-1 installed on the STB 120.

The STB 120 includes a second communication device 121, a second processor 122 and a second storage device 123. The second storage device 123 stores the electronic game 123-1 and the server application 123-2 composed of one or a plurality of program snippets. The STB 120, through the second processor 122, executes the electronic game 123-1 and presents a game image on the display 110, and executes the server application 123-2 through the second processor 122.

The first processor 132, the second processor 122 are, for example, central processing units (CPU), graphic processing units (GPU), physics processing units (PPU), programmable microprocessors, embedded control chips, digital signal processors (DSP), application specific integrated circuits (ASIC) or other similar devices.

The first storage device 133, the second storage device 123 are, for example, any type of fixed or movable random access memories (RAM), read-only memories (ROM), flash memories, secure digital memory cards (SD), hard drives, or other similar devices or a combination of these devices. The first communication device 131, the second communication device 121 are, for example, network cards, WiFi chips, mobile communication chips, Bluetooth modules, etc.

Figure 2:
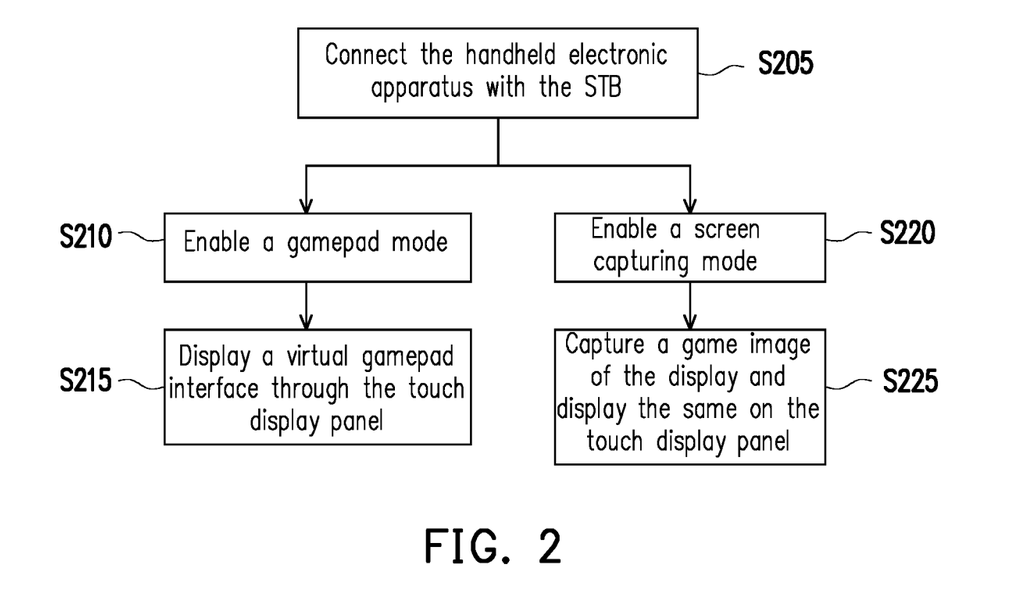
FIG. 2 is a flowchart illustrating a method for controlling a STB game according to an embodiment of the invention.

Steps of a method for controlling a STB game are described in detail below with reference of the aforementioned remote control system 100. FIG. 2 is a flowchart illustrating a method for controlling a STB game according to an embodiment of the invention. Referring to FIG. 1 and FIG. 2, in step S205, the handheld electronic apparatus 130 is connected to the STB 120. For example, the remote control application 133-1 and the server application 123-2 have pairing correlation data, and are adapted to implement connection pairing. In this way, the handheld electronic apparatus 130 may search whether the STB 120 exists within a searching range through the first communication device 131. When the STB 120 is searched, the handheld electronic apparatus 130 may connect the STB 120 through the network 140. The handheld electronic apparatus 130 provides a gamepad mode and a screen capturing mode, and the utilized mode is determined according to an actual situation.

In step S210, the gamepad mode is enabled in the handheld electronic apparatus 130. Then, in step S215, a virtual gamepad interface is displayed through the touch display panel 134. The virtual gamepad interface includes a plurality of virtual function keys, and an operation method of a real gamepad is simulated through the virtual function keys.

Under the gamepad mode, when the touch display panel 134 receives a touch operation, the remote control application 133-1 generates a corresponding keystroke event based on the touch operation of the virtual function keys, and transmits the keystroke event to the STB 120. When the STB 120 receives the keystroke event of the virtual gamepad interface from the handheld electronic apparatus 130, the server application 123-2 converts the keystroke event into a touch event corresponding to the display 110, and executes the touch event through the second processor 122.

On the other hand, in step S220, the screen capturing mode is enabled in the handheld electronic apparatus 130. Then, in step S225, the handheld electronic apparatus 130 captures the game image of the display 110 and displays the same on the touch display panel 134, and the user may control a specific function set in the game image through the touch display panel 134.

Figure 3:
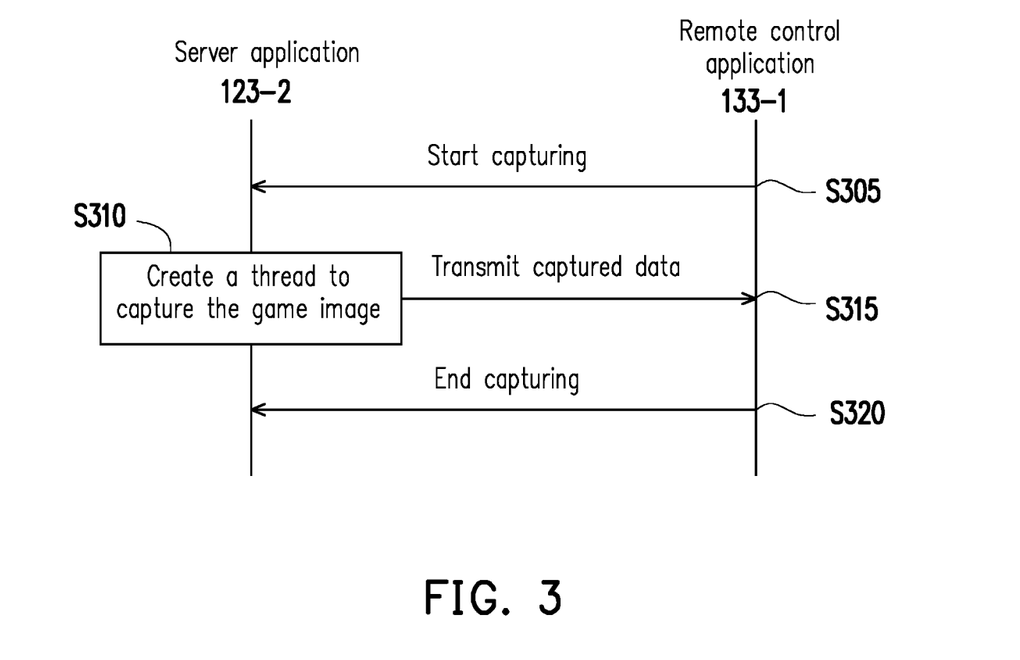
FIG. 3 is a flowchart illustrating a working flow under the screen capturing mode according to an embodiment of the invention.

FIG. 3 is a flowchart illustrating a working flow under the screen capturing mode according to an embodiment of the invention. Referring to FIG. 1 and FIG. 3, in step S305, the remote control application 133-1 sends a capture start request to the server application 123-2. After the server application 123-2 receives the request, in step S310, the server application 123-2 creates a thread to capture the game image presented on the display 110 by the STB 120. Then, in step S315, the server application 123-2 transmits the captured data to the remote control application 133-1. After leaving the screen capturing mode, in step S320, the remote control application 133-1 sends a capture end request to the server application 123-2 to stop capturing the game image.

For example, the server application 123-2 captures a snapshot of the frame of the display 110, and compresses the snapshot into a joint photographic experts group (JPEG) format and transmits the compressed snapshot (game image) to the remote control application 133-1. The server application 123-2 may keep capturing the game images and transmit the captured data to the remote control application 133-1, such that the frame displayed by the touch display panel 134 may be the same with the frame displayed by the display 110. Moreover, a reverse screen projection technique may be applied to capture the game images.

Under the screen capturing mode, when the first processor 132 detects that the touch display panel 134 receives the touch operation through the remote control application 133-1, the first processor 132 transmits a touch position on the touch display panel 134 to the STB 120 though the first communication device 131. The STB 120 converts the touch position into a corresponding position complied with a coordinate system of the display 110 through the server application 123-2, and when it is determined that the corresponding position is within a region set with the specific function, the second processor 122 executes the specific function.

Figure 4A:
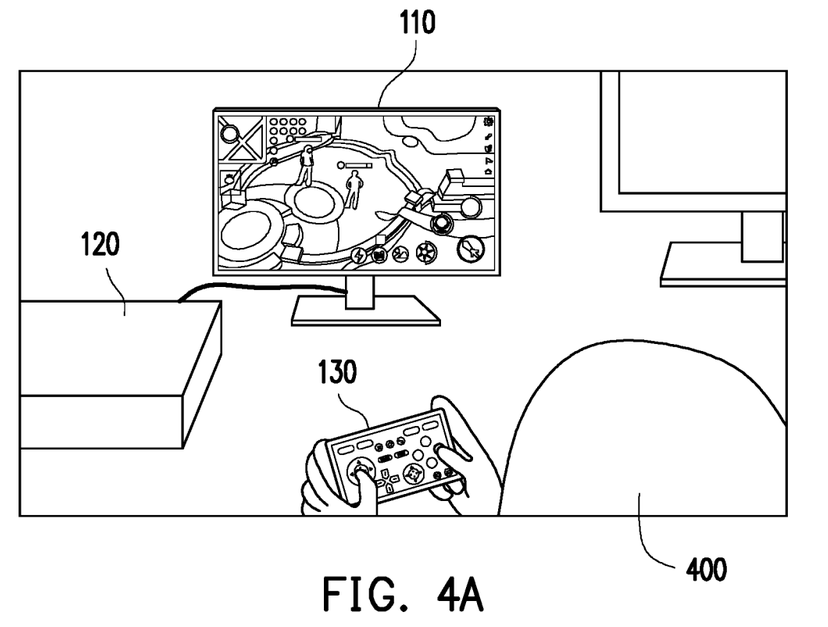
FIG. 4A and FIG. 4B are schematic diagrams of controlling a STB game according to an embodiment of the invention.
Figure 4B:
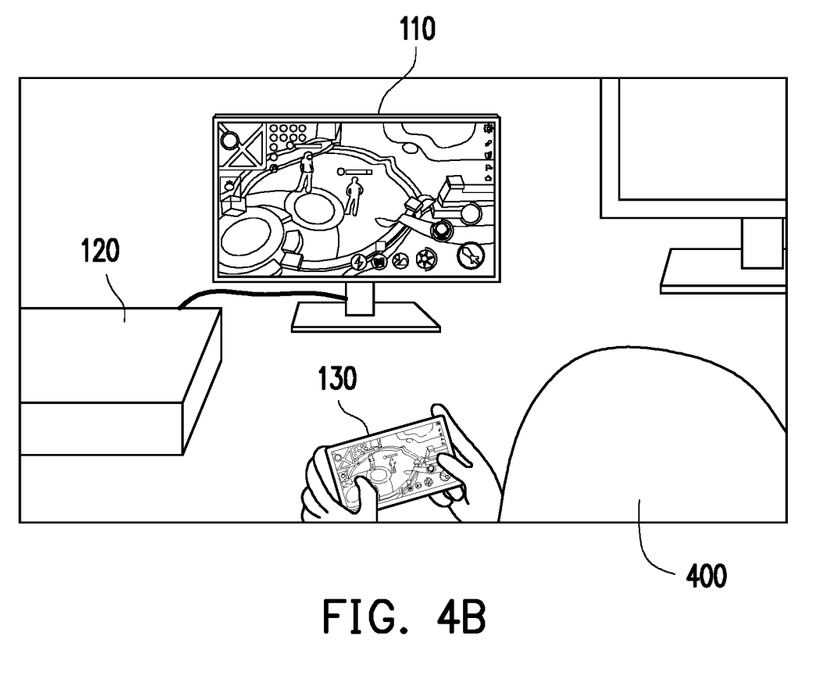

FIG. 4A and FIG. 4B are schematic diagrams of controlling a STB game according to an embodiment of the invention. Referring to FIG. 1, FIG. 4A and FIG. 4B, when the STB 120 executes the electronic game 123-1, a game image of the electronic game 123-1 is displayed on the display 110. A user 400 uses the handheld electronic apparatus 130 to control the game image of the electronic game 123-1. The handheld electronic apparatus 130 shown in FIG. 4A is in the gamepad mode. The handheld electronic apparatus 130 shown in FIG. 4B is in the screen capturing mode.

Therefore, the handheld electronic apparatus 130 may be switched between the gamepad mode and the screen capturing mode, which improves usage convenience. For example, under the gamepad mode of FIG. 4A, an attack operation or a move operation of the electronic game is remotely controlled via the touch display panel 134. Under the screen capturing mode of FIG. 4B, the specific function of buying a game item or changing game equipment, etc., is executed through the touch display panel 134.

Figure 5:
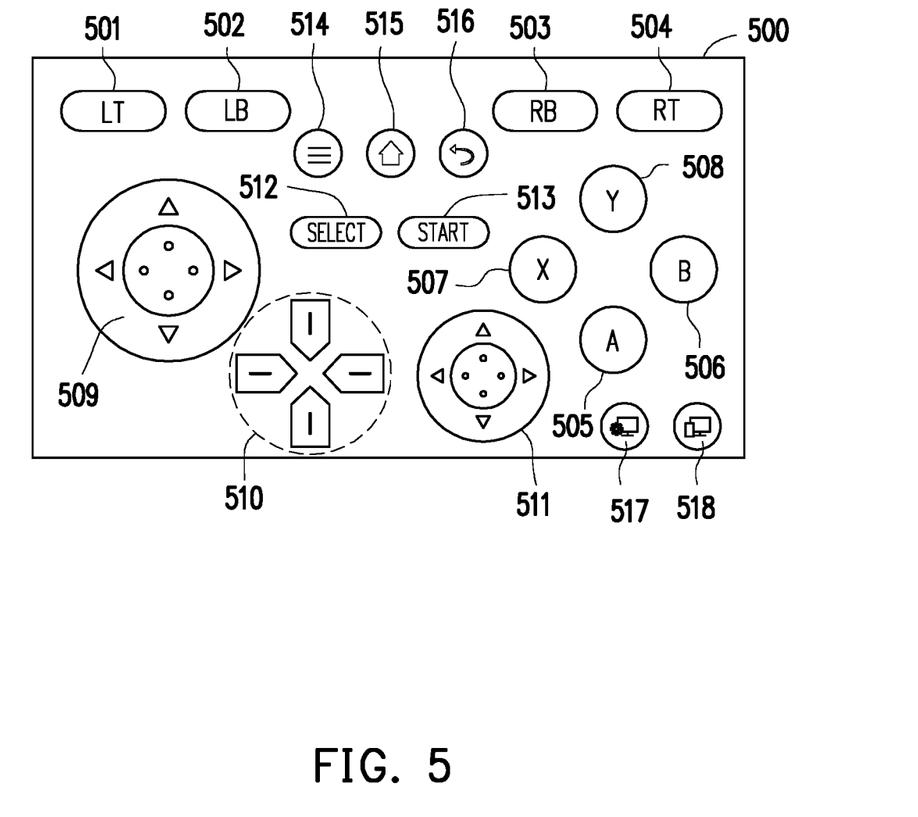
FIG. 5 is a schematic diagram of a virtual gamepad interface according to an embodiment of the invention.

Under the gamepad mode, the touch display panel 134 may display the virtual gamepad interface. FIG. 5 is a schematic diagram of a virtual gamepad interface according to an embodiment of the invention. Referring to FIG. 5, the virtual gamepad interface 500 includes a plurality of virtual function keys 501-516, a pad configuration key 517 and a mode switching key 518. The virtual function keys 501-506 may be used for simulating actual keys of a real gamepad.

The virtual function keys 501-504 correspond to shoulder keys of the real gamepad, the virtual function keys 505-508 correspond to function keys A, B, X, Y of the real gamepad, the virtual function key 509 corresponds to a left stick of the real gamepad, the virtual function key 510 corresponds to a direction key of the real gamepad, the virtual function key 511 corresponds a right stick of the real gamepad, the virtual function keys 512-516 correspond to a selection key, a start/pause key, a menu key, a Home key, a return key of the real gamepad.

Under the gamepad mode, the mode switching key 518 may be touched to switch to the screen capturing mode. The pad configuration key 517 is used for configuring a matching relationship between the virtual function keys of the virtual gamepad interface 500 and the function keys of the electronic game.

Figure 6A:
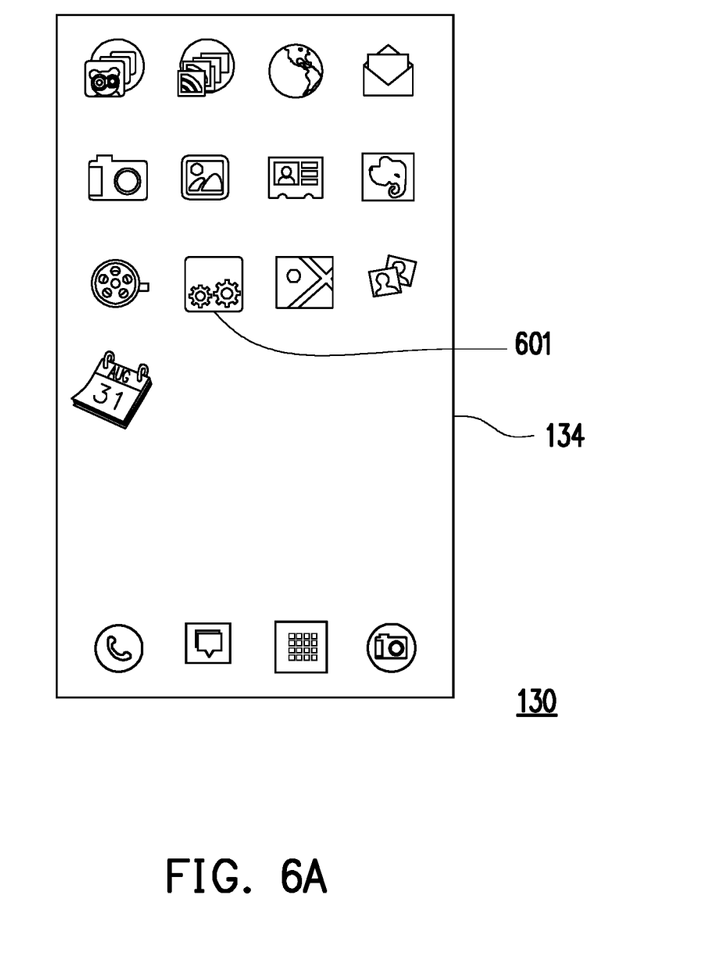
FIG. 6A-FIG. 6C are schematic diagrams of activating the remote control application according to an embodiment of the invention.
Figure 6B:
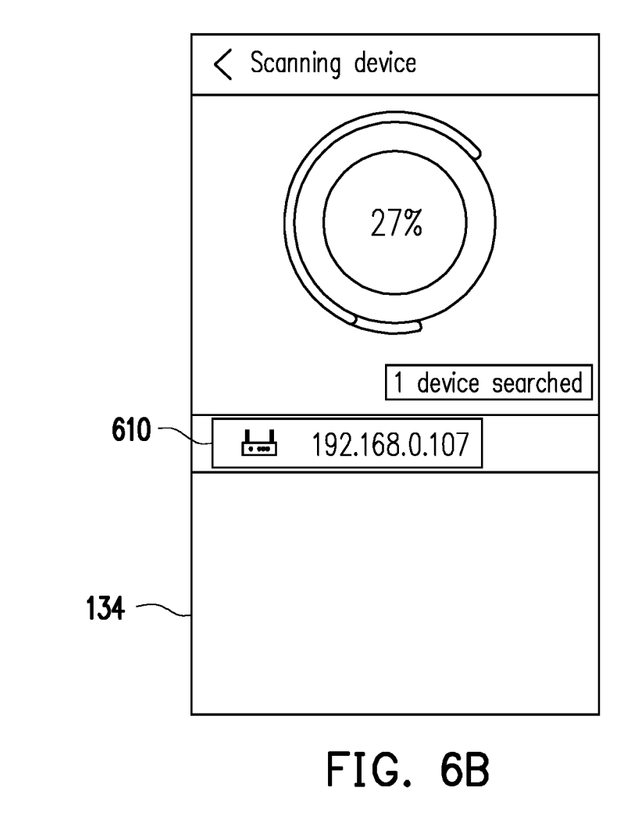
Figure 6C:
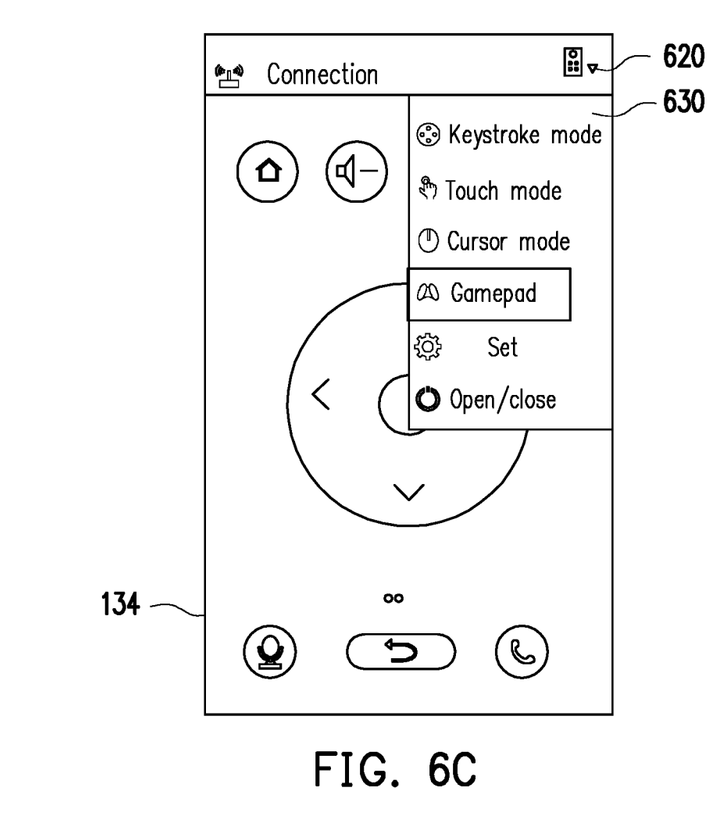

FIG. 6A-FIG. 6C are schematic diagrams of activating the remote control application according to an embodiment of the invention. In FIG. 6A, a frame of the touch display panel 134 of the handheld electronic apparatus 130 includes an icon 601 of the remote control application 133-1, and the user may click the icon 601 to activate the remote control application 133-1.

After the remote control application 133-1 is activated, the first processor 132 searches whether a device adapted for pairing exists within the searching range through the first communication device 131, i.e. determines whether the STB 120 is within a connection range. After the STB 120 is found, as shown in FIG. 6B, the touch display panel 134 displays a searching result, and after an option 610 is enabled, the first processor 132 connects the second communication device 121 of the STB 120 through the first communication device 131.

Then, after the STB 120 and the handheld electronic apparatus 130 are connected, the touch display panel 134 displays a pull-down menu 620, as shown in FIG. 6C, by clicking the pull-down menu 620, a list 630 is spread and displayed, and the user may click "gamepad" in the list 630 to enter the gamepad mode. After the gamepad mode is entered, the touch display panel 134 may display the virtual gamepad interface 500 shown in FIG. 5.

Figure 7A:
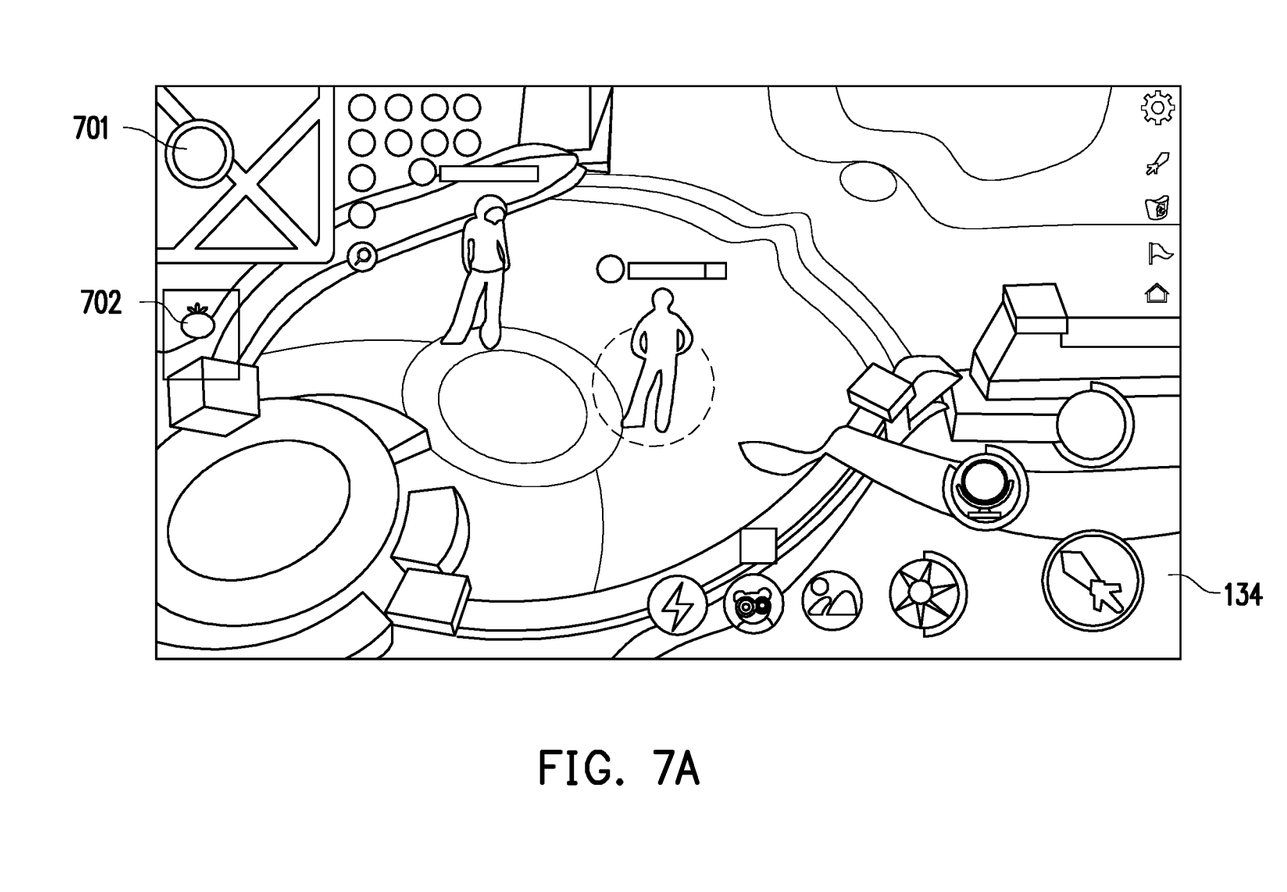
FIG. 7A-FIG. 7C are schematic diagrams of a handheld electronic apparatus in a screen capturing mode according to an embodiment of the invention.
Figure 7B:
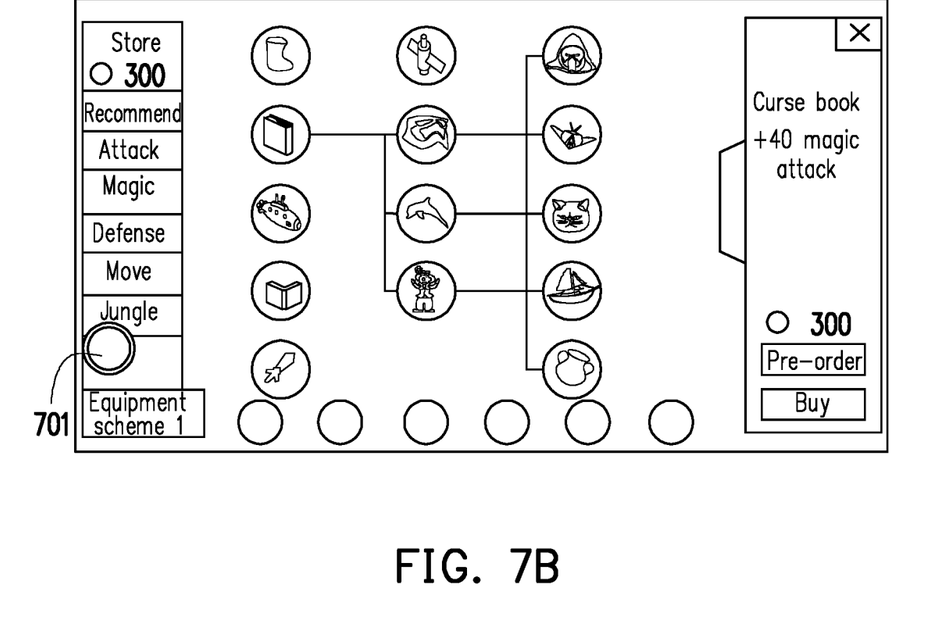
Figure 7C:
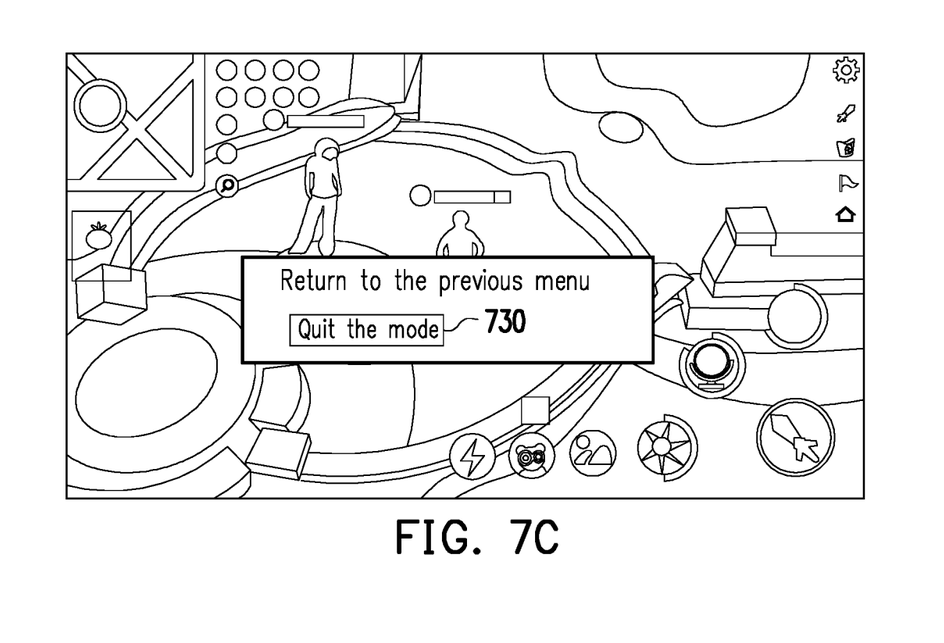

FIG. 7A-FIG. 7C are schematic diagrams of the handheld electronic apparatus in the screen capturing mode according to an embodiment of the invention, which are described below in collaboration with the virtual gamepad interface 500 of FIG. 5. After the user switches to the screen capturing mode by touching the mode switching key 518 in the virtual gamepad interface 500 of FIG. 5, as shown in FIG. 7A, the frame of the touch display panel 134 is switched to the game image of the display 110. Under the screen capturing mode, the user may execute a specific function by clicking a specific region of the touch display panel 134.

For example, it is assumed that a region 702 corresponds to an operation button of "buying game item". When the user performs a touch operation in the region 702 of the touch display panel 134, the STB 120 switches the game image into a buy page. Meanwhile, the frame of the touch display panel 134 is simultaneously switched to the frame of the buy page, as that shown in FIG. 7B. Then, the user may perform touch operations on the touch display panel 134 to execute the specific function of buying game items.

Moreover, the frame displayed under the screen capturing mode further has a virtual control key 701. The screen capturing mode may be quitted by enabling the virtual control key 701. For example, after clicking the virtual control key 701, the frame of the touch display panel 134 is as that shown in FIG. 7C, and after an option 730 is enabled, the frame of the touch display panel 134 is switched back to the virtual gamepad interface 500 shown in FIG. 5.

Figures 8A, 8B:
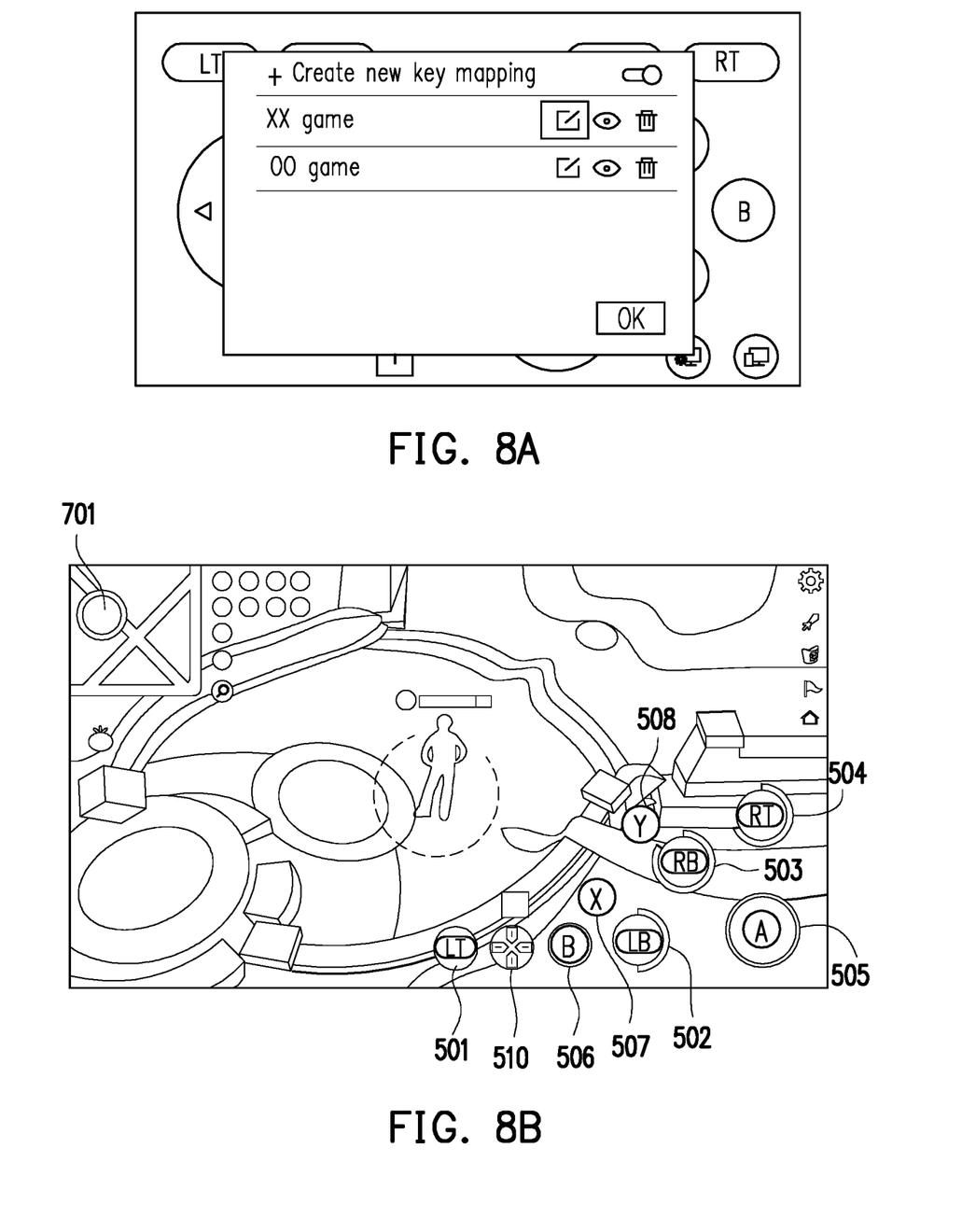
FIG. 8A and FIG. 8B are schematic diagrams of function configuration of a virtual gamepad interface according to an embodiment of the invention.

FIG. 8A and FIG. 8B are schematic diagrams of function configuration of the virtual gamepad interface according to an embodiment of the invention. Referring to FIG. 5, FIG. 8A and FIG. 8B, after the pad configuration key 517 of the virtual gamepad interface 500 is pressed, a configuration page shown in FIG. 8A is entered. The user may create a plurality of game operation configurations through the configuration page of FIG. 8. After the operation configurations are created, options of editing configuration, default configuration and deleting configuration may be selected.

For example, in FIG. 8A, an option of editing configuration of "XX game" is selected to enter a configuration frame shown in FIG. 8B. The configuration frame is displayed on the touch display panel 134 by capturing the game image of the display 110 for the user to adjust configurations, so as to respectively set the specific functions set in the game image to different virtual function keys. As shown in FIG. 8B, 9 regions having the specific functions in the game image are respectively allocated to the virtual function keys 501-508 and 510. After the configuration adjustment is completed, the user may quit the configuration frame thought the virtual control key 701.

In summary, the handheld electronic apparatus having the touch display panel is used for controlling the STB, and the handheld electronic apparatus provides the old gamepad operation mode in collaboration with the touch operation mode to provide a more intuitive operation feeling. Namely, under the gamepad mode, the virtual gamepad interface is provided to simulate the real gamepad; and under the screen capturing mode, the touch display panel of the handheld electronic apparatus displays a frame that is the same to the frame displayed by the display, such that the user may execute the specific functions as if operating a mobile game. By alternating the gamepad mode and the screen capturing mode, frame delay caused by the only screen catering mode is avoided, and the operations limited to the virtual function keys under only the gamepad mode may be ameliorated. In this way, the STB game may be effectively controlled.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for controlling set-top box game, comprising:
connecting a handheld electronic apparatus with a set-top box, wherein the handheld electronic apparatus comprises a touch display panel and provides a gamepad mode and a screen capturing mode, and the set-top box is installed with an electronic game and is configured to present a game image on a display;
after the handheld electronic apparatus is connected to the set-top box, when the gamepad mode is enabled, displaying a virtual gamepad interface through the touch display panel, wherein the virtual gamepad interface comprises a plurality of virtual function keys, and an operation method of a real gamepad is simulated through the virtual function keys; and
after the handheld electronic apparatus is connected to the set-top box, when the screen capturing mode is enabled, capturing the game image of the display and displaying the game image on the touch display panel such that a frame displayed by the touch display panel is the same with a frame displayed by the display, and controlling a specific function set in the game image through the touch display panel, wherein
under the gamepad mode, after determining a mode switching key is enabled, the handheld electronic apparatus is switched to the screen capturing mode,
under the screen capturing mode, after determining a virtual control key is enabled, the handheld electronic apparatus is switched to the gamepad mode.

2. The method for controlling set-top box game as claimed in claim 1, wherein after the step of displaying the virtual gamepad interface through the touch display panel, the method further comprises:
when the set-top box receives a keystroke event of the virtual gamepad interface from the handheld electronic apparatus, converting the keystroke event into a touch event corresponding to the display by the set-top box, and executing the touch event by the set-top box.

3. The method for controlling set-top box game as claimed in claim 1, wherein after the step of capturing the game image of the display and displaying the game image on the touch display panel, the method further comprises:
when it is detected that the touch display panel receives a touch operation, transmitting a touch position of the touch display panel to the set-top box by the handheld electronic apparatus;
converting the touch position into a corresponding position complied with a coordinate system of the display by the set-top box; and
when it is determined that the corresponding position is within a region set with the specific function, executing the specific function by the set-top box.

4. The method for controlling set-top box game as claimed in claim 1, wherein under the gamepad mode, the touch display panel is applied to remote-control an attack operation or a move operation of the electronic game.

5. The method for controlling set-top box game as claimed in claim 1, wherein the specific function comprises buying a game item or changing game equipment.

6. A remote control system, comprising:
a display;
a set-top box, coupled to the display, installed with an electronic game, and presenting a game image of the electronic game to the display when executing the electronic game; and
a handheld electronic apparatus, comprising a touch display panel, and providing a gamepad mode and a screen capturing mode,
wherein after the handheld electronic apparatus is connected to the set-top box, when the gamepad mode is enabled, a virtual gamepad interface is displayed through the touch display panel, wherein the virtual gamepad interface comprises a plurality of virtual function keys, and an operation method of a real gamepad is simulated through the virtual function keys, and
after the handheld electronic apparatus is connected to the set-top box, when the screen capturing mode is enabled, the game image of the display is captured and displayed on the touch display panel such that a frame displayed by the touch display panel is the same with a frame displayed by the display, and a specific function set in the game image is controlled through the touch display panel, wherein
under the gamepad mode, after determining a mode switching key is enabled, the handheld electronic apparatus is switched to the screen capturing mode,
under the screen capturing mode, after determining a virtual control key is enabled, the handheld electronic apparatus is switched to the gamepad mode.

7. The remote control system as claimed in claim 6, wherein the handheld electronic apparatus further comprises:
a first communication device, connected to the set-top box through a network;
a first storage device, storing a remote control application composed of one or a plurality of program snippets; and a first processor, coupled to the touch display panel, the first communication device and the first storage device, and executing the remote control application to control the electronic game, wherein after the first processor executes the remote control application, the first processor is connected to the set-top box through the first communication device, and displays an operation interface, wherein the operation interface provides a gamepad mode and a screen capturing mode.

8. The remote control system as claimed in claim 7, wherein the set-top box comprises:

a second communication device, connected to the handheld electronic apparatus through the network;

a second storage device, storing the electronic game and a server application composed of one or a plurality of program snippets; and a second processor, coupled to the display, the second communication device and the second storage device, executing the electronic game and presenting a game image of the electronic game to the display, and executing the server application, so as to communicate with the remote control application through the server application, wherein in case that the gamepad mode of the handheld electronic apparatus is enabled, when the set-top box receives a keystroke event of the virtual gamepad interface from the handheld electronic apparatus, the second processor converts the keystroke event into a touch event corresponding to the display through the server application, and executes the touch event, in case that the screen capturing mode of the handheld electronic apparatus is enabled, when the first processor detects that the touch display panel receives a touch operation, the first processor transmits a touch position of the touch display panel to the set-top box through the first communication device; the set-top box converts the touch position into a corresponding position complied with a coordinate system of the display through the second processor, and executes the specific function when determining that the corresponding position is within a region set with the specific function.

9. The remote control system as claimed in claim 6, wherein the handheld electronic apparatus controls the specific function set in the game image through the touch display panel under the screen capturing mode.

10. A handheld electronic apparatus, comprising:

a communication device, connected to a set-top box through a network;

a touch display panel;

a storage device, storing a remote control application composed of one or a plurality of program snippets; and a processor, coupled to the communication device, the touch display panel and the storage device, and executing the remote control application to control an electronic game on the set-top box, wherein after the processor executes the remote control application, the processor is connected to the set-top box through the communication device, and displays an operation interface, wherein the operation interface provides a gamepad mode and a screen capturing mode, when the gamepad mode is enabled, the processor displays a virtual gamepad interface through the touch display panel, wherein the virtual gamepad interface comprises a plurality of virtual function keys, and an operation method of a real gamepad is simulated through the virtual function keys, when the screen capturing mode is enabled, the processor captures the game image presented in a display by the set-top box and displays the game image on the touch display panel such that a frame displayed by the touch display panel is the same with a frame displayed by the display, and controls a specific function set in the game image through the touch display panel, wherein under the gamepad mode, after determining a mode switching key is enabled, the handheld electronic apparatus is switched to the screen capturing mode, under the screen capturing mode, after determining a virtual control key is enabled, the handheld electronic apparatus is switched to the gamepad mode.

* * * * *